Figure 1:
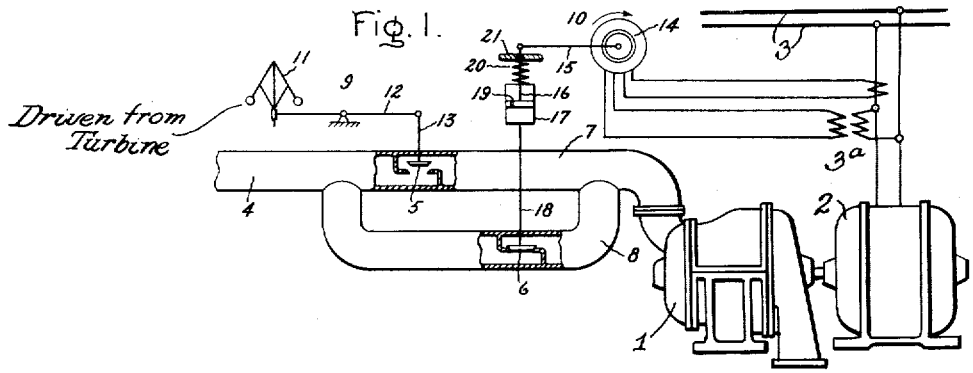

Aug. 8, 1933.  M. STÖHR  1,921,710

REGULATING SYSTEM

Filed May 2, 1931

Inventor:
Max Stöhr,
by Charles E. Tullar
His Attorney.

Patented Aug. 8, 1933

1,921,710

UNITED STATES PATENT OFFICE 1,921,710

REGULATING SYSTEM

Max Stöhr, Berlin-Spandau, Germany, assignor to General Electric Company, a Corporation of New York Application May 2, 1931, Serial No. 534,680, and in Germany May 17, 1930

2 Claims. (Cl. 264—11)

The present invention relates to regulating systems for power engines, particularly elastic fluid engines which are subjected to great fluctuations in demand for load output, but is not necessarily limited thereto. The customary method of regulating power engines is based on the principle of maintaining constant the speed of such engines.

It is well known that the speed of a power engine remains constant as long as the load input equals the load output, including the losses of the engine. The balanced condition, however, is disturbed as soon as the demand for load output increases which causes a decrease of speed of the rotating part of the engine owing to the fact that the kinetic energy of such part is then partly transformed into load output. The speed change of the rotating member which indicates the existence of an unbalanced condition is normally utilized to cause the actuation of certain means, such as for instance an admission valve in the case of an elastic fluid engine in order to restore the balanced condition.

This method however involves certain difficulties as the actuation of such valves by means of speed responsive devices very often takes place too abruptly and results in oscillatory speed changes of the engine, a condition which is known as hunting. In cases where a power engine drives an electric generator which is electrically coupled in parallel with other electric generators and motors, particularly synchronous motors, the hunting of a prime mover may affect the stability of the whole network in general and of the synchronous motors in particular. For this reason it is important that power engines be provided with a satisfactory regulating system.

The object of my invention is to provide an improved arrangement for regulating power engines, especially engines which are subjected to great and sudden load changes whereby hunting of the engines is substantially prevented.

According to my invention I provide a speed responsive device and a load responsive device for controlling the valve means or the like for regulating the supply of an actuating medium to a prime mover. The speed responsive device may be directly driven by the prime mover and the load responsive device may be directly responsive to the mechanical load output of the prime mover or to the load output or a condition thereof of a machine such as a generator driven by the prime mover. In the case of an electrical generator the load responsive device may operate in response to the electrical watt output of the generator or to the current or voltage or like condition of the load output. With such an arrangement the load responsive device causes movement of at least a part of the valve means before a substantial speed change and accordingly an action of the speed responsive device takes place. According to my invention I provide means for causing the load responsive device to be slowly returned to its original position whereby a corresponding return motion of the valve means is compensated or prevented by the action of the speed responsive device. Preferably I provide means including a dashpot for the load responsive mechanism. The provision of a dashpot or the like prevents the load responsive device from causing movement of the valve means at slow load changes. It is desirable at slow load changes to regulate the prime mover or engine directly by the speed responsive mechanism.

For a better understanding of what I consider to be novel and my invention, attention is directed to the following description and the claims appended hereto in connection with the accompanying drawing.

Figure 2:
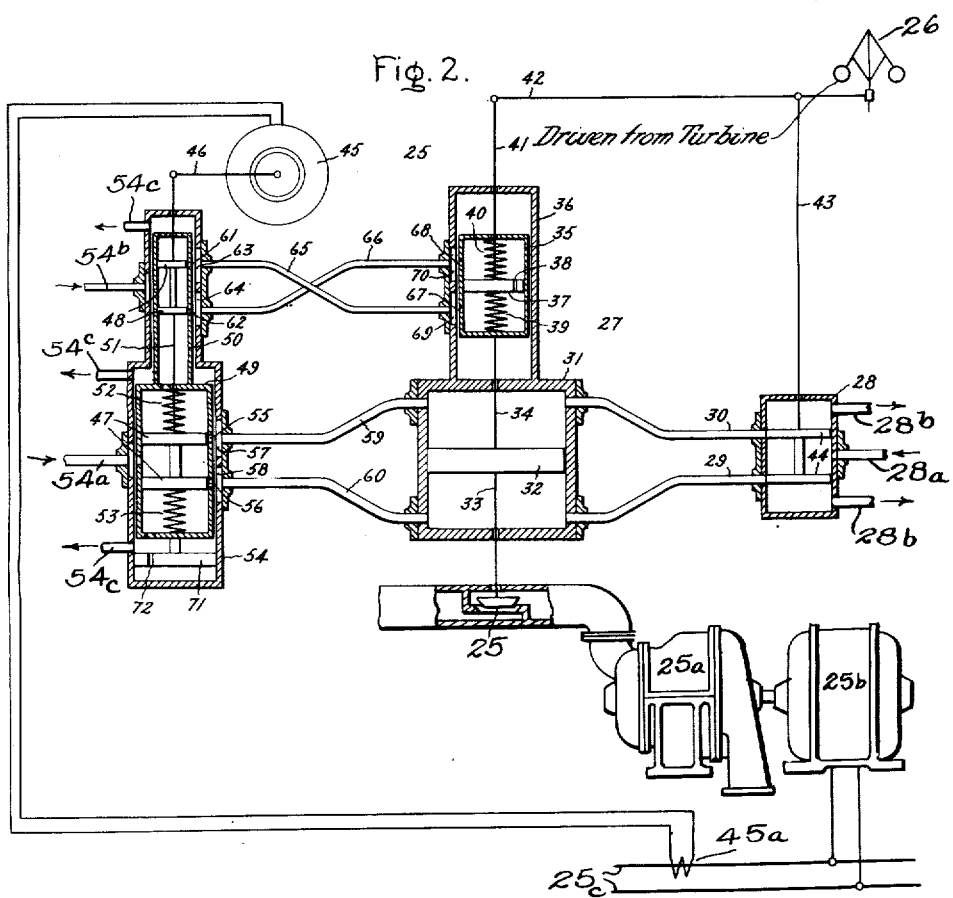

In the drawing, Fig. 1 shows a regulating system embodying my invention, and Fig. 2 shows a modification thereof.

Referring to Fig. 1, 1 designates an engine or prime mover driving an electric generator 2 which supplies electric energy to a power line 3, and 4 indicates a branched conduit for supplying elastic or actuating fluid to the prime mover. 5 and 6 represent two valve means provided in the branches 7 and 8 of the elastic fluid line and actuated by means of speed and load responsive devices 9 and 10 respectively. The speed responsive device, as shown in the present instance, comprises an ordinary speed regulator 11 provided at one end of a fulcrumed lever 12, the other end of which being directly connected with the piston stem 13 of valve means 5. The speed governor is driven from the shaft of the prime mover by any well known drive mechanism, not shown. The load responsive device may be of any desirable kind, such as an electromagnetic relay, or of the watt meter type.

The load responsive device 10, as shown in the present instance, comprises a watt meter 14 connected to the generator through current and voltage transformers indicated at 3ª. A movable member of the device is adapted to turn a lever 15 in response to load changes. Lever 15 has one end connected to the piston stem 16 of a damping means 17, in the present instance shown as a dashpot, the cylinder of which being connected to the stem 18 of valve means 6. The dashpot is filled with a fluid such as oil. In order to allow relative movement between the dashpot cylinder and the piston thereof I may provide an opening 19 in the latter. The disk of valve means 6 is normally pressed against its seat. This is achieved by the provision of a spring 20 which is secured to the top of dashpot cylinder 17 and fastened in a compressed state to a fixed spring plate 21.

The operation of this mechanism is as follows: The valve means 5 in a balanced condition of the power engine will be opened far enough to allow sufficient elastic fluid to pass the conduit 4 through branch 7. The valve means 6 will be closed in a balanced condition by the action of spring 20. If now, for instance, a sudden increase in the desired load output occurs an immediate actuation of the watt meter 14 will be caused before the speed regulating means 11 is affected by the load change. As a result of this sudden movement of the watt meter 14 which may be termed an output meter, in the direction of the arrow indicated in Fig. 1, the valve means 6 will be opened and the necessary increased demand for elastic fluid will be supplied through branch 8 of conduit 4. A gradual closing of valve means 6 will take place thereafter in view of the action of spring 20 and the closing of valve 6 will necessarily cause a corresponding gradual opening movement of valve means 5 under action of the speed governor. It will be readily understood that valve means 6 is gradually closed which causes a gradual opening of valve means 5 and thus prevents hunting of the engine. Thus the load output responsive means causes regulation at sudden load changes and its slow return causes the speed responsive device to gradually open valve 5.

From another aspect the load responsive mechanism after having rapidly opened valve 6 returns to its original position under action of spring 20 and thereby causes valve 6 to be slowly closed, the slow action being accomplished by the provision of a dashpot. The closing of valve 6 effects a slow decrease in speed which in turn causes the speed responsive mechanism to open valve 5. Thus the slow closing action of the load responsive mechanism is compensated by a slow opening actuation of the valve means by the speed responsive mechanism.

It is well known to those skilled in the art that the danger of falling out of step of synchronous machines is generally greater in the case of load increase than in the case of sudden load decrease. In Fig. 1 of the drawing, therefore, I have shown a system in which the load output responsive means responds to load increases only. The system as shown in this figure is furthermore characterized by the features of the provisions of separate valve means which are directly operated by the speed and load output responsive devices respectively.

My system of regulating power engines may be modified so that one valve only is necessary with the load responsive means actuating said valve means in either direction. Such modification is shown in Fig. 2 of the drawing.

Referring to Fig. 2, 25 represents a load fixing or regulating means, in the present instance shown as a valve, for the regulation of the fluid supplied to an engine. Valve 25 is operated by a speed responsive device 26 and a fluid actuated motor 27. The latter is controlled by a pilot valve 28 having conduits 29 and 30 connected to the lower and upper part of a cylinder 31 respectively. 28a is a supply conduit and 28b designates discharge conduits for an actuating fluid such as oil under pressure for the motor. 32 indicates a piston movably arranged in said cylinder and having a stem 33 connected to the valve. In alinement with stem 33 is another stem 34 connected to piston 32 and the bottom of a cylinder 35. The latter is movably arranged in an outer cylinder 36, which is fastened to cylinder 31. Movably arranged in cylinder 35 is a piston 37 having an opening 38 and being normally maintained in a central position by the provision of springs 39 and 40. 41 represents a rod connecting piston 37 to the left end of a lever 42, an intermediate point of this lever being connected to a link 43 which carries the heads or disks 44 of a pilot valve 28. Secured to the right-hand end of lever 42 is the speed responsive device 26, in the present instance shown as an ordinary speed governor.

The operation of the mechanism so far described is as follows: The regulating valve 25 will remain in a definite position and the pilot valve disks 44 will remain in their original position, that is, cover the pilot valve ports leading to conduits 29 and 30 as long as a balanced condition of the power engine exists. If now, for instance, the speed decreases somewhat, in view of a somewhat increased demand of load, the fly weights of the speed responsive device will move inwardly and thereby cause a downward movement of the pilot valve disks whereby oil or like fluid will be pressed into the lower part of the cylinder 31 and drained off from the upper part of said cylinder. This causes an upward movement of the cylinder piston 32 and therefore an opening movement of valve 25. The upward movement of the latter causes a corresponding upward movement of the stems 34 and 41 and of the left end of lever 42 which in turn effects an upward movement of link 43 whereby the pilot valve disks restore their original position. It will be noted that the movement of cylinder piston 32 and the parts connected therewith, particularly the cylinder 35 and the link 41, does not effect a relative movement between said cylinder 35 and said link 41, or, in other words, does not effect a movement of piston 37 within cylinder 35, such movement being effectively prevented by the provision of springs 39 and 40. Thus it will become clear that in case the system responds to sudden changes of load the parts 34 and 37 to 41 act like a rigid connecting means between piston 32 and the left end of lever 42.

Referring to the left part of Fig. 2, 45 represents a load responsive device similar to the device 14 of Fig. 1 and actuating a lever 46. In the present instance I have diagrammatically shown device 45 as being connected to the secondary circuit of a current transformer 45a, the primary circuit of which is defined by line 25c. With such an arrangement lever 46 is turned in response to the change in load demand in line 25c. 47 and 48 represent the pilot valve disks of two pilot valve cylinders 49 and 50, the latter being integrally formed with each other and the disks being connected with each other by means of a stem 51. 52 and 53 represent springs which normally cause the lower and the upper pilot valve disks 47 and 48 respectively to remain in a central position in the corresponding pilot valve cylinder 49. 54 represents an outer cylinder in which both pilot valve cylinders 49 and 50 are movably arranged. 55 and 56 represent the valve ports of the lower pilot valve normally covered by the corresponding valve disks 47 and registering with wider ports 57 and 58 respectively of the outer cylinder 54; the latter being connected by means of conduits 59 and 60 to the upper and lower part of cylinder 31 of the fluid actuated motor 27. In a similar manner ports 61 and 62 are provided in the cylinder 50 of the upper pilot valve registering with corresponding wider ports 63 and 64 of the outer cylinder 54 respectively; the latter having conduits 65 and 66 connected to the lower and upper part of the movable dashpot cylinder 35. It will be noted that cylinder 35 is similarly provided with ports 67 and 68 which register with corresponding wider ports 69 and 70 in the outer cylinder 36, the latter being connected to the conduits 65 and 66. The outer cylinder 54 for the pilot valves is provided with supply conduits 54a and 54b for the lower and upper pilot valve respectively. Oil under pressure or like actuating fluid may be supplied from any suitable source, not shown, through these conduits to the pilot valves. 54c designates discharge conduits connected to the outer cylinder 54 for draining oil. The direction of flow of actuating fluid through the different conduits is indicated by arrows.

The operation of this mechanism is as follows: Suppose the mechanism is in balanced condition, as shown in the drawing. If now a sudden load change takes place, for instance, an increase in load demand, the load responsive device 45 will respond to the increased load demand and in the present instance will effect a downward movement of the left end of lever 46 and of the lower and upper pilot valve disk 47 and 48 respectively. The downward movement of the lower pilot valve disk 47 causes oil to be supplied through the ports 56, 58 and the conduit 60 to the lower part of cylinder 31 and it also causes oil to be drained off from the upper part of said cylinder 31 through conduit 59, ports 57 and 55, to the upper part of pilot valve cylinder 49, whence said oil or like fluid may be returned to any suitable tank, not shown in the drawing.

The supply of fluid to the lower part of cylinder 31 and the draining off of fluid from the upper part thereof causes an upward movement of the cylinder piston 32 and accordingly an upward movement of the regulating means, that is an opening of valve 25. The upward movement of cylinder piston 32 would normally cause a corresponding upward movement of rods 34 and 41 and thus impart a sudden actuation to the speed regulating means 26. This is effectively prevented according to my invention by the arrangement of the damping means 35, 37 and the upper pilot valve 48 of my mechanism, the significance of which will become clear from the following:

As already stated, an increased load demand causes a downward movement of the lower pilot valve disks and simultaneously a corresponding movement of the upper valve disks, as both are rigidly connected with each other. The downward movement of the upper pilot valve disks causes oil or like fluid, to be forced through ports 62, 64, conduits 66, through ports 70 and 68, into the upper part of the movable cylinder 35, and it also causes oil to be drained off from the lower part of cylinder 35 through ports 67, 69, conduit 65 and ports 63, 61 into the upper part of the pilot valve cylinder 50. The supply of oil into the upper part and the draining off of such fluid from the lower part of the movable cylinder 35 will cause a relative movement between said cylinder and its piston 37 to the effect that the latter moves downwardly within the cylinder or, in other words, the cylinder moves relatively upwardly with respect to its piston. In reality an upward movement of the cylinder takes place simultaneously with the upward movement of cylinder piston 32 to the effect that their upward movements do not affect the position of piston 37 and stem 41 and thus remain without influence on the speed governor position.

In other words, the springs 39 and 40 in cylinder 35 under normal conditions cause a balanced position of piston 37 with respect to its cylinder 35. If now, in view of an unbalanced condition of the power engine, oil or like fluid is pressed into the upper part of cylinder 35 and drained off from the lower part of this cylinder, the resulting condition may be considered as a tensioning of spring 40 and a compressing of spring 39. Cylinder 35 thereby is moved upwardly with respect to piston 37 by the upward movement of piston 32 of the fluid actuated motor.

As soon as the actuation of the pilot valve disks 47 and 48 by the load responsive device 45 is terminated these pilot valve disks will be gradually returned to their original position, owing to the provision of springs 52 and 53 in the lower pilot valve which tend to maintain, as already stated, the pilot valve disks 47 in a central position within pilot valve cylinder 49 whereby they cover the ports 55 and 56. A retardation of the pilot valve movements is effected by the provision of a damping means, in the present instance illustrated as a piston 71 having an opening 72 and being connected to the bottom of the lower pilot valve cylinder 49. Piston 71 and the lower part of cylinder 54 form in substance a dashpot which besides its dampening action serves at slow load changes to prevent the load responsive device from causing regulation of the valve. It will be understood that during slow downward movement of stem 51 and the pilot valve heads the inner cylinders 49 and 50 follow the downward movement and thus prevent the pilot valve heads from uncovering the ports. A similar result is effected when the load responsive device causes upward movement of stem 51. A restoring actuation also takes place with respect to the relative position between cylinder 35 and the movable piston 37 therein.

As stated above, the supply of oil to the upper part of dashpot cylinder 35 and the discharge of oil from the lower part of this cylinder cause the cylinder to move upwardly relative to the piston, whereby spring 39 is compressed and spring 40 tensioned. As soon as the pilot valve 48 for the dashpot assumes its original position the dashpot cylinder 30 is also returned to its central position under action of the springs, in the present instance cylinder 35 is moved downwardly. This action takes place slowly under displacement of oil or like fluid between the upper and the lower part of the dashpot cylinder through opening 38 in the piston. The slow downward movement of the cylinder causes a closing movement of the regulating valve, to the effect that less actuating fluid is supplied to the engine, resulting in a decrease in speed of the latter. The closing movement of the valve under action of the dashpot is compensated by an opening movement of the valve caused by the speed governor 26, as it will be readily understood that as soon as the speed decreases owing to the closing of the valve, the governor flyballs move inwardly and thereby cause downward movement of pilot valve heads 44 for the fluid actuated motor 31. The fluid actuated motor 31 thereby opens valve 25, or, in other words, compensates the closing action of this valve by the dashpot mechanism.

It will be readily understood that the last mentioned actuation takes place gradually and thus prevents hunting of the engine.

If the load output of the engine decreases, the load responsive device 45 will cause the pilot valve disks to move upwardly to the effect that oil will be supplied to the upper part of the cylinder 31 and also to the lower part of cylinder 35 with the result that the valve disk 25 is moved downwardly and also that the cylinder 35 is moved downwardly relative to its piston 37. The upward movement of pilot valve 48 permits actuating fluid to be supplied to the lower part of the dashpot cylinder and discharged from the upper part thereof. The dashpot cylinder thereby moves downwardly and causes compressing of spring 40 and tensioning of spring 39. As soon as pilot valve heads 48 resume their original position the dashpot cylinder is moved to its central position under action of the springs in a similar way as described above and thereby causes opening of valve 25. The resulting increase in speed causes actuation of the speed governor, to the effect that the opening movement of the valve by the dashpot is prevented by the action of the speed governor.

In accordance with the provisions of the patent statutes I have described the method of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination with a power engine, a conduit for supplying actuating fluid to the engine, a valve in the conduit, a motor for controlling the valve, two pilot valves for the motor, a load output responsive means controlling one of the pilot valves, a speed responsive means controlling the other pilot valve, means biasing the first named pilot valve to its central position, means for preventing the first pilot valve from uncovering its port at slow movements of the load output responsive means, a dashpot connected to the valve including a piston and biasing means for normally maintaining the piston in a central position, another pilot valve connected to the load output responsive means and the first named pilot valve and having ports connected to the upper and lower part respectively of the dashpot for causing displacement of fluid in the dashpot in response to movement of the load responsive device.

2. In combination with a power engine, a conduit for supplying fluid to the engine, a valve in the conduit, a motor for moving the valve, a mechanism including a speed governor and a pilot valve for controlling the motor, a load output responsive device, another pilot valve connected to the load output responsive device and a dashpot having a piston connected to the other pilot valve for controlling the motor at sudden load changes, another dashpot between the speed governor and the valve, and a third pilot valve connected to the load output responsive device and the other pilot valve, said third pilot valve having ports connected to the other dashpot for preventing movement of the motor at sudden load changes from being imparted to the speed governor.

MAX STÖHR.

CERTIFICATE OF CORRECTION.

Patent No. 1,921,710.  August 8, 1933.

MAX STOHR.

It is hereby certified that error appears in the printed specification of the above numbered patent requiring correction as follows: Page 2, line 13, after "21." insert the sentence "Thus the arrangement is such that spring 20 tends to force the dashpot cylinder and accordingly the valve downwardly."; and that the said Letters Patent should be read with this correction therein that the same may conform to the record of the case in the Patent Office.

Signed and sealed this 26th day of September, A. D. 1933.

F. M. Hopkins

Acting Commissioner of Patents.

(Seal)

closing movement of the regulating valve, to the effect that less actuating fluid is supplied to the engine, resulting in a decrease in speed of the latter. The closing movement of the valve under action of the dashpot is compensated by an opening movement of the valve caused by the speed governor 26, as it will be readily understood that as soon as the speed decreases owing to the closing of the valve, the governor flyballs move inwardly and thereby cause downward movement of pilot valve heads 44 for the fluid actuated motor 31. The fluid actuated motor 31 thereby opens valve 25, or, in other words, compensates the closing action of this valve by the dashpot mechanism.

It will be readily understood that the last mentioned actuation takes place gradually and thus prevents hunting of the engine.

If the load output of the engine decreases, the load responsive device 45 will cause the pilot valve disks to move upwardly to the effect that oil will be supplied to the upper part of the cylinder 31 and also to the lower part of cylinder 35 with the result that the valve disk 25 is moved downwardly and also that the cylinder 35 is moved downwardly relative to its piston 37. The upward movement of pilot valve 48 permits actuating fluid to be supplied to the lower part of the dashpot cylinder and discharged from the upper part thereof. The dashpot cylinder thereby moves downwardly and causes compressing of spring 40 and tensioning of spring 39. As soon as pilot valve heads 48 resume their original position the dashpot cylinder is moved to its central position under action of the springs in a similar way as described above and thereby causes opening of valve 25. The resulting increase in speed causes actuation of the speed governor, to the effect that the opening movement of the valve by the dashpot is prevented by the action of the speed governor.

In accordance with the provisions of the patent statutes I have described the method of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination with a power engine, a conduit for supplying actuating fluid to the engine, a valve in the conduit, a motor for controlling the valve, two pilot valves for the motor, a load output responsive means controlling one of the pilot valves, a speed responsive means controlling the other pilot valve, means biasing the first named pilot valve to its central position, means for preventing the first pilot valve from uncovering its port at slow movements of the load output responsive means, a dashpot connected to the valve including a piston and biasing means for normally maintaining the piston in a central position, another pilot valve connected to the load output responsive means and the first named pilot valve and having ports connected to the upper and lower part respectively of the dashpot for causing displacement of fluid in the dashpot in response to movement of the load responsive device.

2. In combination with a power engine, a conduit for supplying fluid to the engine, a valve in the conduit, a motor for moving the valve, a mechanism including a speed governor and a pilot valve for controlling the motor, a load output responsive device, another pilot valve connected to the load output responsive device and a dashpot having a piston connected to the other pilot valve for controlling the motor at sudden load changes, another dashpot between the speed governor and the valve, and a third pilot valve connected to the load output responsive device and the other pilot valve, said third pilot valve having ports connected to the other dashpot for preventing movement of the motor at sudden load changes from being imparted to the speed governor.

MAX STÖHR.

CERTIFICATE OF CORRECTION.

Patent No. 1,921,710.            August 8, 1933.

MAX STOHR.

It is hereby certified that error appears in the printed specification of the above numbered patent requiring correction as follows: Page 2, line 13, after "21." insert the sentence "Thus the arrangement is such that spring 20 tends to force the dashpot cylinder and accordingly the valve downwardly."; and that the said Letters Patent should be read with this correction therein that the same may conform to the record of the case in the Patent Office.

Signed and sealed this 26th day of September, A. D. 1933.

F. M. Hopkins

Acting Commissioner of Patents.

(Seal)

CERTIFICATE OF CORRECTION.

Patent No. 1,921,710.                                                            August 8, 1933.

MAX STOHR.

It is hereby certified that error appears in the printed specification of the above numbered patent requiring correction as follows: Page 2, line 13, after "21." insert the sentence "Thus the arrangement is such that spring 20 tends to force the dashpot cylinder and accordingly the valve downwardly."; and that the said Letters Patent should be read with this correction therein that the same may conform to the record of the case in the Patent Office.

Signed and sealed this 26th day of September, A. D. 1933.

F. M. Hopkins (Seal)                                  Acting Commissioner of Patents.